United States Patent
Rubio Diaz et al.

(10) Patent No.: US 12,215,062 B2
(45) Date of Patent: Feb. 4, 2025

(54) MULTI-STAGE CONSOLIDATION PROCESS FOR CERAMIC MATRIX COMPOSITE PREPREG MATERIAL

(71) Applicant: Rolls-Royce plc, London (GB)

(72) Inventors: Virtudes Rubio Diaz, London (GB); Matthew Hocking, London (GB)

(73) Assignee: Rolls-Royce plc

( * ) Notice: Subject to any disclaimer, the term of this patent is extended or adjusted under 35 U.S.C. 154(b) by 163 days.

(21) Appl. No.: 17/984,589

(22) Filed: Nov. 10, 2022

(65) Prior Publication Data

US 2024/0158307 A1 May 16, 2024

(51) Int. Cl.
| | | |
|---|---|---|
| *B32B 18/00* | (2006.01) | |
| *B28B 13/02* | (2006.01) | |
| *B28B 23/00* | (2006.01) | |
| *C04B 35/645* | (2006.01) | |
| *C04B 35/80* | (2006.01) | |

(52) U.S. Cl.
CPC ............ *C04B 35/80* (2013.01); *C04B 35/645* (2013.01); *C04B 2235/5252* (2013.01); *C04B 2235/6581* (2013.01)

(58) Field of Classification Search
CPC .................. C04B 35/80; C04B 65/645; C04B 2235/5252; C04B 2235/6581; C04B 35/6269; C04B 2237/38; B32B 18/00; B28B 13/021; B28B 23/0006
See application file for complete search history.

(56) References Cited

U.S. PATENT DOCUMENTS

| | | | |
|---|---|---|---|
| 4,357,193 A | | 11/1982 | McGann et al. |
| 4,562,033 A | | 12/1985 | Johnson et al. |
| 4,963,215 A | | 10/1990 | Ayers |
| 5,569,422 A | | 10/1996 | Astier et al. |
| 6,039,832 A | * | 3/2000 | McCarville ............... B32B 3/12 |
| | | | 156/292 |
| 6,660,115 B2 | | 12/2003 | Butler et al. |
| 7,153,379 B2 | | 12/2006 | Millard et al. |
| 7,919,039 B2 | | 4/2011 | Kanka |
| 8,840,393 B2 | | 9/2014 | Wilenski et al. |
| 9,302,946 B2 | | 4/2016 | Ritti et al. |
| 10,584,070 B2 | | 3/2020 | Corman et al. |
| 11,383,494 B2 | | 7/2022 | Hockemeyer et al. |
| 2008/0120372 A1 | | 5/2008 | Kariathungal et al. |
| 2011/0027095 A1 | | 2/2011 | Jensen |
| 2011/0139344 A1 | * | 6/2011 | Watson ................... B29C 73/32 |
| | | | 156/499 |
| 2013/0206320 A1 | * | 8/2013 | Mungas .............. C04B 41/5057 |
| | | | 156/89.26 |
| 2014/0193270 A1 | | 7/2014 | Plunkett et al. |
| 2017/0095984 A1 | * | 4/2017 | Anderson ............. B29C 70/342 |
| 2019/0168481 A1 | * | 6/2019 | Butler ..................... B32B 5/024 |
| 2022/0152944 A1 | * | 5/2022 | Dahlgren ............... B32B 27/34 |

FOREIGN PATENT DOCUMENTS

| | | |
|---|---|---|
| CN | 106985416 | 7/2017 |

\* cited by examiner

*Primary Examiner* — Jacob T Minskey
*Assistant Examiner* — Caroline Beha
(74) *Attorney, Agent, or Firm* — Barnes & Thornburg LLP

(57) ABSTRACT

A method used for forming ceramic matrix composite components includes several steps. The method comprises arranging a layup of a predetermined number of prepreg ceramic plies on a layup too and a plurality of different stages to debulk and consolidate the layup.

20 Claims, 12 Drawing Sheets

| NUMBER PLY | DEBULKING YES/NO |
|---|---|
| 1 | YES |
| 2 | YES |
| 3 | NO |
| 4 | YES |
| 5 | NO |
| 6 | YES |
| 7 | NO |
| 8 | YES |
| 9 | NO |
| 10 | YES |
| 11 | NO |
| 12 | YES |
| 13 | NO |
| 14 | YES |
| 15 | NO |
| 16 | YES |

*FIG. 4*

| NUMBER PLY | DEBULKING YES/NO |
|---|---|
| 1 | YES |
| 2 | YES |
| 3 | NO |
| 4 | YES |
| 5 | NO |
| 6 | YES |
| 7 | NO |
| 8 | YES |
| EXTENDED DEBULKING | |
| 9 | NO |
| 10 | YES |
| 11 | NO |
| 12 | YES |
| 13 | NO |
| 14 | YES |
| 15 | NO |
| 16 | YES |
| EXTENDED DEBULKING | |

*FIG. 5*

MULTI-STAGE CONSOLIDATION PROCESS FOR CERAMIC MATRIX COMPOSITE PREPREG MATERIAL

FIELD OF THE DISCLOSURE

The present disclosure relates generally to ceramic matrix composite material components and more specifically to methods of manufacturing ceramic matrix composite components.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and is ignited. Products of the combustion reaction in the combustor are directed into the turbine where work is extracted to drive the compressor and, sometimes, an output shaft. Left-over products of the combustion are exhausted out of the turbine and may provide thrust in some applications.

Products of the combustion reaction directed into the turbine flow over airfoils included in stationary vanes and rotating blades of the turbine. The interaction of combustion products with the airfoils heats the airfoils to temperatures that require the airfoils to be made from high-temperature resistant materials and/or to be actively cooled by supplying relatively cool air to the vanes and blades.

To this end, some airfoils for vanes and blades, along with other components in the engine are incorporating composite materials adapted to withstand very high temperatures. Design and manufacture of vanes, blades, and other components from composite materials presents challenges because of the geometry and strength required for the parts.

SUMMARY

The present disclosure may comprise one or more of the following features and combinations thereof.

A method may include arranging a layup on a layup tool. In some embodiments, the method may include arranging a layup of a predetermined number of impregnated ceramic plies on the layup tool.

In some embodiments, the method may further includes performing a preliminary consolidation stage. The preliminary consolidation stage may include: assembling a set of preliminary consolidation consumables over the layup, applying a vacuum pressure to withdrawn air between the set of preliminary consolidation consumables and the layup, and heating the layup to a first predetermined temperature for a predetermined preliminary consolidation period to partially cure the layup.

In some embodiments, the method may further includes performing a final consolidation stage. The final consolidation stage may include: assembling a set of final consolidation consumables over the layup once the set of preliminary consolidation consumables are removed from the layup, applying a vacuum pressure to withdrawn air between the set of final consolidation consumables and the layup, and heating the layup to a second predetermined temperature greater than the first predetermined temperature for a predetermined final consolidation period to fully cure the layup. The set of final consolidation consumables may have a lower flexibility and a higher temperature capability than the set of preliminary consolidation consumables.

In some embodiments, the set of preliminary consolidation consumables may include a perforated release film layer, a plurality of thin breather layers, a thick breather layer, and a vacuum stretch bag. The step of assembling the set of preliminary consolidation consumables over the layup may include overlaying the perforated release film layer over an exposed surface of the layup, overlaying the plurality of thin breather layers over the perforated release film layer, overlaying the thick breather layer over the think breather layers, and overlaying the vacuum stretch bag over the thick breather layer.

In some embodiments, the set of final consolidation consumables may include a perforated release film layer, a release film layer, first and second thick breather layers, and a high-temperature stretch bag. The step of assembling the set of final consolidation consumables over the layup may include overlaying the perforated release film layer over an exposed surface of the layup, overlaying the first thick breather layer over the perforated release film layer, overlaying the release film layer over the first thick breather layer, overlaying the second thick breather layer over the release film layer, and overlaying the high-temperature stretch bag over the second thick breather layer.

In some embodiments, the step of heating the layup to the first predetermined temperature for the predetermined preliminary consolidation period may include increasing the temperature of the heat applied to the layup from an initial temperature to the first predetermined temperature and maintaining the first predetermined temperature for the predetermined preliminary consolidation period. In some embodiments, the step of heating the layup to the first predetermined temperature for the predetermined preliminary consolidation period may further include decreasing the heat applied to the layup back to the initial temperature after the predetermined preliminary consolidation period.

In some embodiments, the step of heating the layup to the second predetermined temperature for the predetermined final consolidation period may include increasing the temperature of the heat applied to the layup from the initial temperature to the second predetermined temperature and maintaining the second predetermined temperature for the predetermined final consolidation period. In some embodiments, the step of heating the layup to the second predetermined temperature for the predetermined final consolidation period may further include decreasing the heat applied to the layup back to the initial temperature after the predetermined final consolidation period.

In some embodiments, the predetermined preliminary consolidation period may be equal to the predetermined final consolidation period. In some embodiments, the temperature of the heat applied to the layup may be increased at the same rate during the preliminary consolidation stage and the final consolidation stage. In some embodiments, the vacuum pressure may be the same at the preliminary consolidation stage and the final consolidation stage.

These and other features of the present disclosure will become more apparent from the following description of the illustrative embodiments.

BRIEF DESCRIPTION OF THE DRAWINGS

FIG. 4 is a table showing that the intermediate debulking stage may include adding additional prepreg ceramic plies to the layup after each intermediate debulk until the layup has the desired number of plies;

FIG. 5 is a table showing that the extended debulking stage may include repeating the intermediate debulking stage after the extended debulking stage;

DETAILED DESCRIPTION OF THE DRAWINGS

Figure 1:
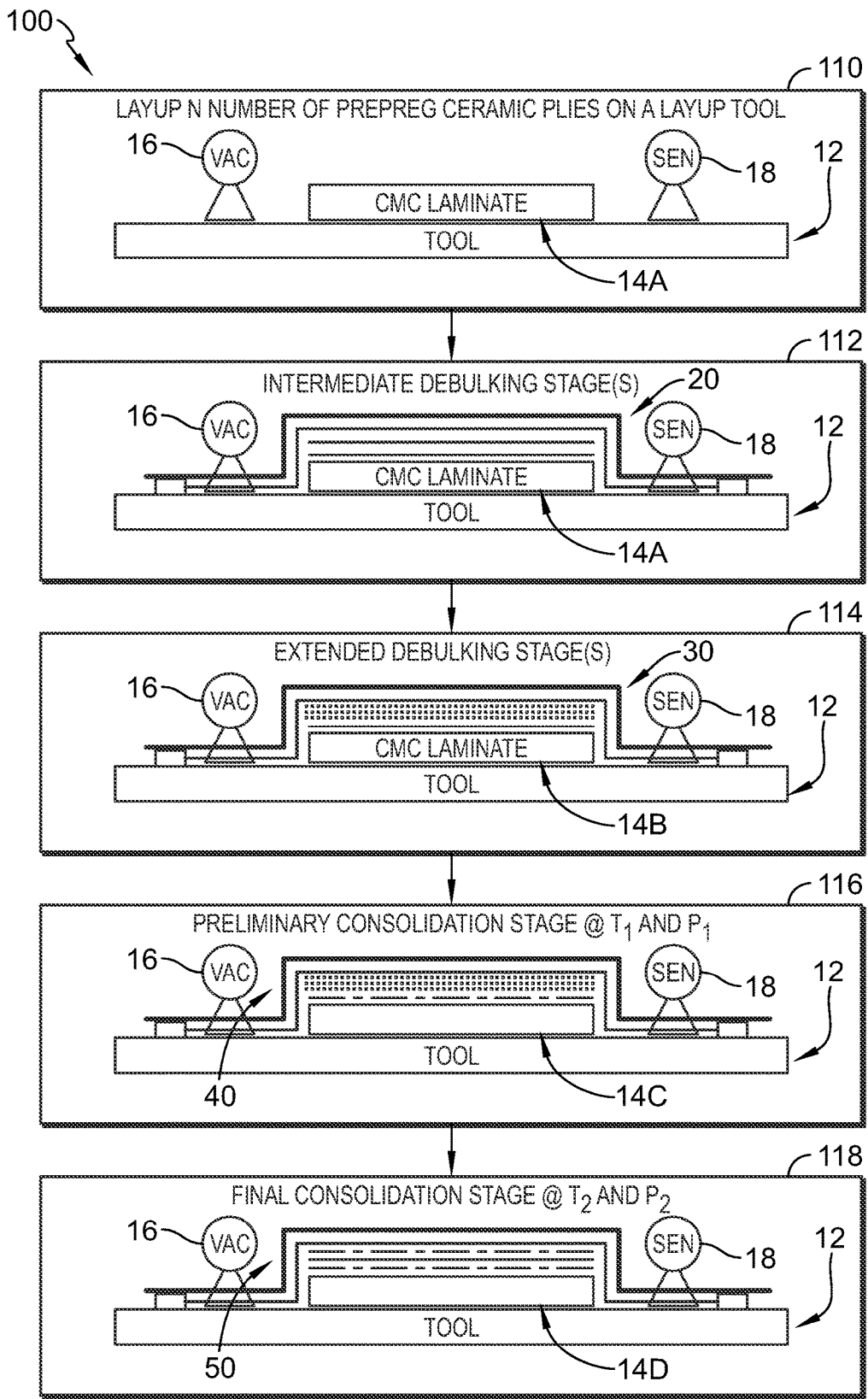
FIG. 1 is a diagrammatic view of a process for forming ceramic matrix composite components showing that the process includes arranging a number of prepreg ceramic plies on a layup tool, an intermediate debulking stage and an extended debulking stage at which the layup of ceramic plies is infiltrated with a matrix material and applied with a vacuum pressure to debulk the layup, a preliminary consolidation stage at which the debulked layup is partially cured, and a final consolidation stage at which the layup is fully cured to form a solid ceramic matrix composite preform.

For the purposes of promoting an understanding of the principles of the disclosure, reference will now be made to a number of illustrative embodiments illustrated in the drawings and specific language will be used to describe the same.

An illustrative process 100 for forming ceramic matrix composite components is shown in FIG. 1. The process 100 begins with arranging a number of prepreg ceramic plies on a layup tool 12 to be debulked and consolidated into a solid ceramic matrix composite preform as suggested by box 110. As layers are added, the laying of material produces a layup 14A with a thickness that is above the intended thickness of the final component. Therefore, the process 100 includes an intermediate debulking stage 112 and an extended debulking stage 114 to remove bulk. After the intermediate and extended debulking stages 112, 114, the process 100 includes a preliminary consolidation stage 116 and a final consolidation stage 118 to fully cure and harden the debulked layup 14B into the solid ceramic matrix composite preform.

The intermediate debulking stage 112 and the extended debulking stage 114 remove bulk by regularly bleeding excess matrix material over an entire surface of the layup 14A to compact the layup 14A. The intermediate debulking stage 112 keeps bulk low and fiber lengths correct, while the extended debulking stage 114 evens out the bulk distribution over the layup 14A. Each debulking state 112, 114 uses a different set of consumables during the debulking process. The intermediate debulking stage 112 includes the use of a set intermediate stage consumables 20, while the extended debulking stage includes the use of a set of extended stage consumables 30.

The preliminary consolidation stage 116 and the final consolidation stage 118 apply heat at predetermined temperatures to the debulked layup 14B to fully cure and harden the debulked layup 14B into the solid ceramic matrix composite preform. The preliminary consolidation stage 116 includes the use of a set of preliminary consolidation consumables 40 that has a high flexibility to apply torque avoiding marks, damage and movement of the layup 14B. The final consolidation stage 118 includes the use of a set of final consolidation consumables 50 that has a higher temperature capability than the set of preliminary consolidation consumables 40 to withstand the high temperature heat applied to the layup 14C. By consolidating the layup 14B in the separate preliminary and final consolidation stages 116, 118, the amount of defects in the final component is reduced.

Figure 2:
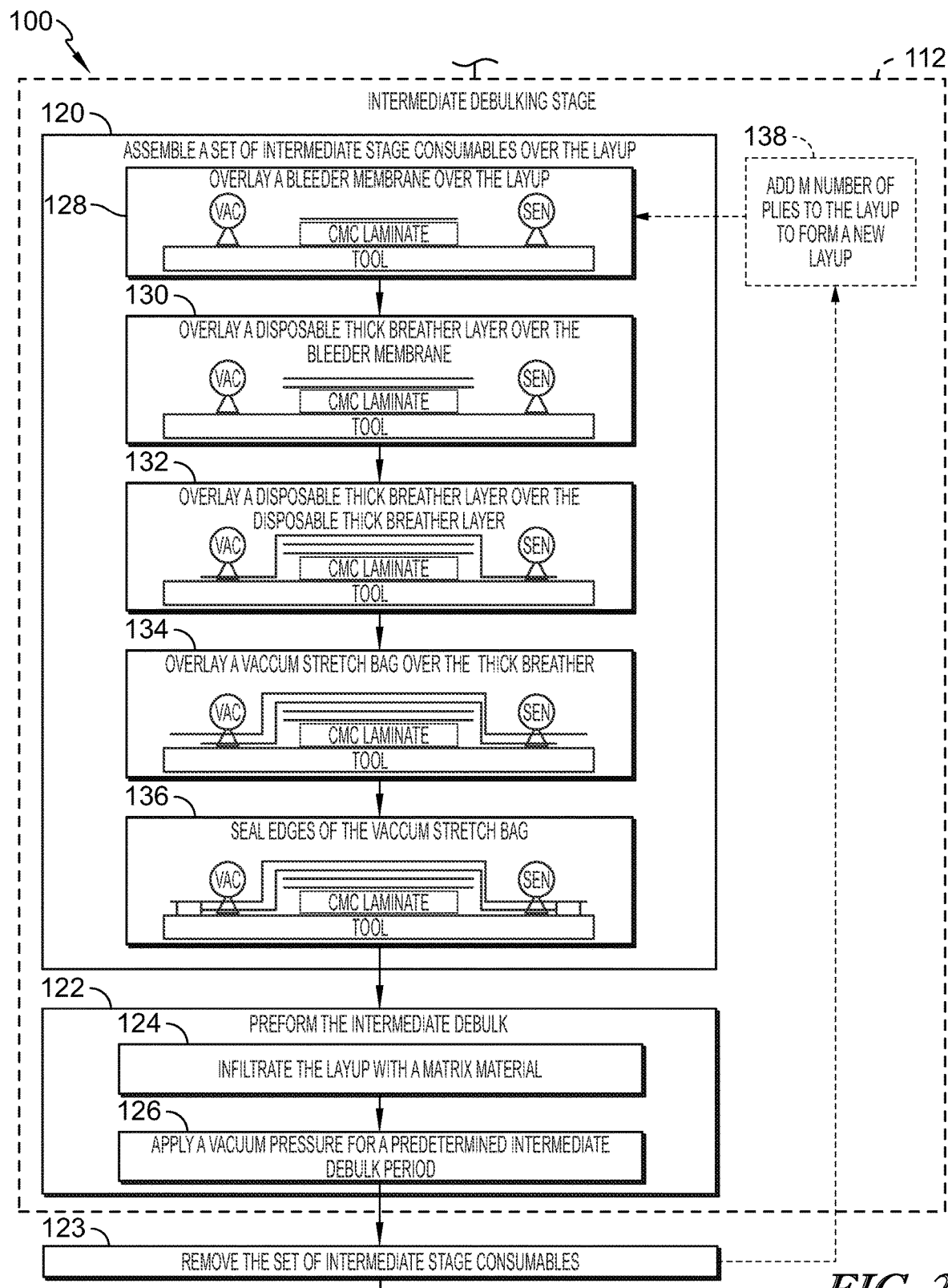
FIG. 2 is a diagrammatic view of the intermediate debulking stage of the process of FIG. 1 showing the intermediate debulking stage includes the steps of assembling a set of intermediate stage consumables over the layup and performing the intermediate debulk to remove excess matrix material.

The intermediate debulking stage 112 includes the steps of assembling the set of intermediate stage consumables 20 over the layup 14A as suggested by block 120 and performing the intermediate debulk as suggested by block 122 in FIG. 2. The intermediate debulk 122 includes infiltrating the layup 14A with a matrix material as suggested by block 124 and applying a vacuum pressure for a predetermined intermediate debulk period as suggested by block 126. The vacuum pressure is applied by a vacuum 16 to withdrawn the air between the set of intermediate stage consumables 20 and the layup 14A thereby bleeding excess matrix material over the entire surface of the layup 14A.

Figure 2A:
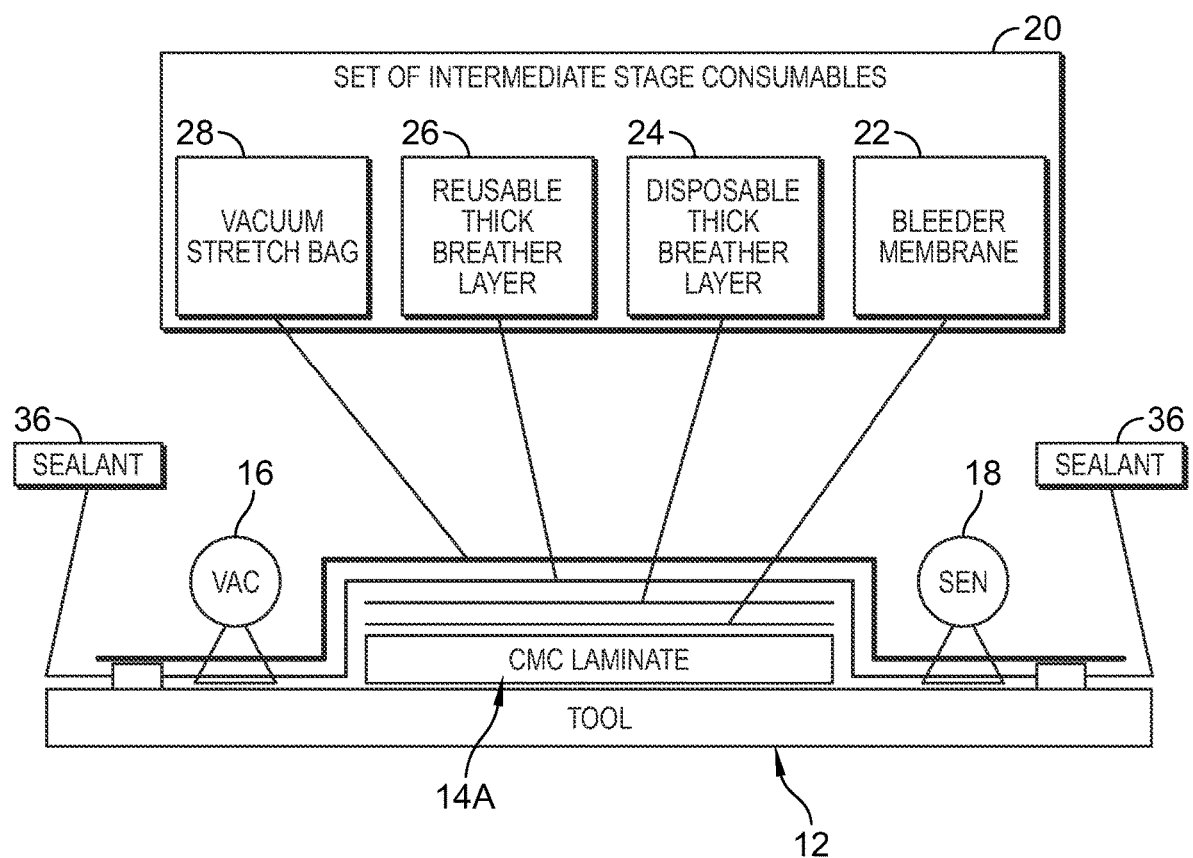
FIG. 2A is a diagrammatic view of the layup of ceramic plies on the layup tool with the set of intermediate stage consumables arranged over the layup showing the set of intermediate stage consumables includes a bleeder membrane that directly overlays an exposed surface of the layup, a disposable thick breather layer that overlays the bleeder membrane, a reusable thick breather layer that overlays the disposable thick breather layer, and a vacuum stretch bag that overlays the reusable thick breather layer.

The step of assembling the set of intermediate stage consumables 20 over the layup 14A includes overlaying the different consumable layers 22, 24, 26, 28 over the layup 14A as suggested by blocks 128, 130, 132, 134 and sealing the set of intermediate stage consumables 20 to the layup tool 12 as suggested by block 136 in FIG. 2. The set of intermediate stage consumables 20 includes a bleeder membrane 22, thick breather layers 24, 26, and a vacuum stretch bag 28 as shown in FIGS. 2 and 2A.

The bleeder membrane 22 is configured to allow excess matrix material to bleed therethrough as the vacuum pressure is applied so that the excess matrix material is uniformly bled in a thickness direction from the layup 14A to provide a homogenous distribution of the matrix material. The thick breather layers 24, 26 are configured to absorb excess matrix material that bleeds through the bleeder membrane 22. The vacuum stretch bag 28 is sealed to the layup tool 14 so that when the vacuum pressure is applied, the air between the set of intermediate stage consumables 20 and the layup 14A is withdrawn to apply the vacuum pressure.

The different intermediate stage consumable layers are assembled by first overlaying the bleeder membrane 22 over the exposed surface 14AS of the layup 14A as suggested by block 128. Then, the disposable thick breather layer 24 is laid over the bleeder membrane 22 as suggested by block 130 and the reusable thick breather layer 26 is laid over the disposable thick breather layer 24 as suggested by block 132. Lastly, the vacuum stretch bag 28 is laid over the reusable thick breather layer 26 as suggested by block 134 and sealed to the layup tool 12 with sealant 36 as suggested by block 136.

After the vacuum pressure is applied to layup 14A on the layup tool 12, the vacuum pressure is held for the predetermined intermediate debulk period. The vacuum pressure is less than or equal to about −85 kPa. The vacuum 16 withdraws the air, while the gauge 18 shows the pressure in the vacuum stretch bag 28. The predetermined intermediate debulk period is about 15 minutes.

After the predetermined intermediate debulk period, the set of intermediate stage consumables 20 are removed from the layup 14A by each layer as suggested by block 123. The bleeder membrane 22 needs to be removed slowly and carefully to avoid lifting the laid plies. Then, depending on the number of plies of the layup 14A, the intermediate debulking stage may be repeated as suggested by block 138 in FIG. 2.

The intermediate debulking stage 112 includes performing multiple intermediate debulks as plies are added to the layup 14A as suggested by block 138 in FIG. 2. After the set of intermediate stage consumables 20 are removed from the layup 14A, the desired number of plies are added to the layup 14A. Then the steps of assembling the set of intermediate stage consumables 20 over the layup 14A and performing the intermediate debulk 122 are repeated.

For the subsequent intermediate debulks 122, the vacuum stretch bag 28 and the reusable thick breather layer 26 are reused. The bleeder membrane 22 and the disposable thick breather layer 24 are not reused and instead a new bleeder membrane 22 and disposable thick breather layer 24 are assembled over the layup 14A. The vacuum stretch bag 28 and the reusable thick breather layer 26 are reused for each intermediate debulk 122 until the desired number of plies is reached.

As shown in FIG. 4, the intermediate debulking stage 112 is repeated after a second ply is added and then again after every addition of two more plies. In the illustrative embodiment, the intermediate debulking stage 112 may be repeated until the layup 14A includes 16 plies of ceramic material.

In some embodiments, at a certain number of plies, the process 100 continues to the extended debulking stage 114 as shown in FIG. 5. In the illustrative embodiment, the process 100 continues to the extended debulking stage 114 after the layup 14A includes eight plies of ceramic material.

Figure 3:
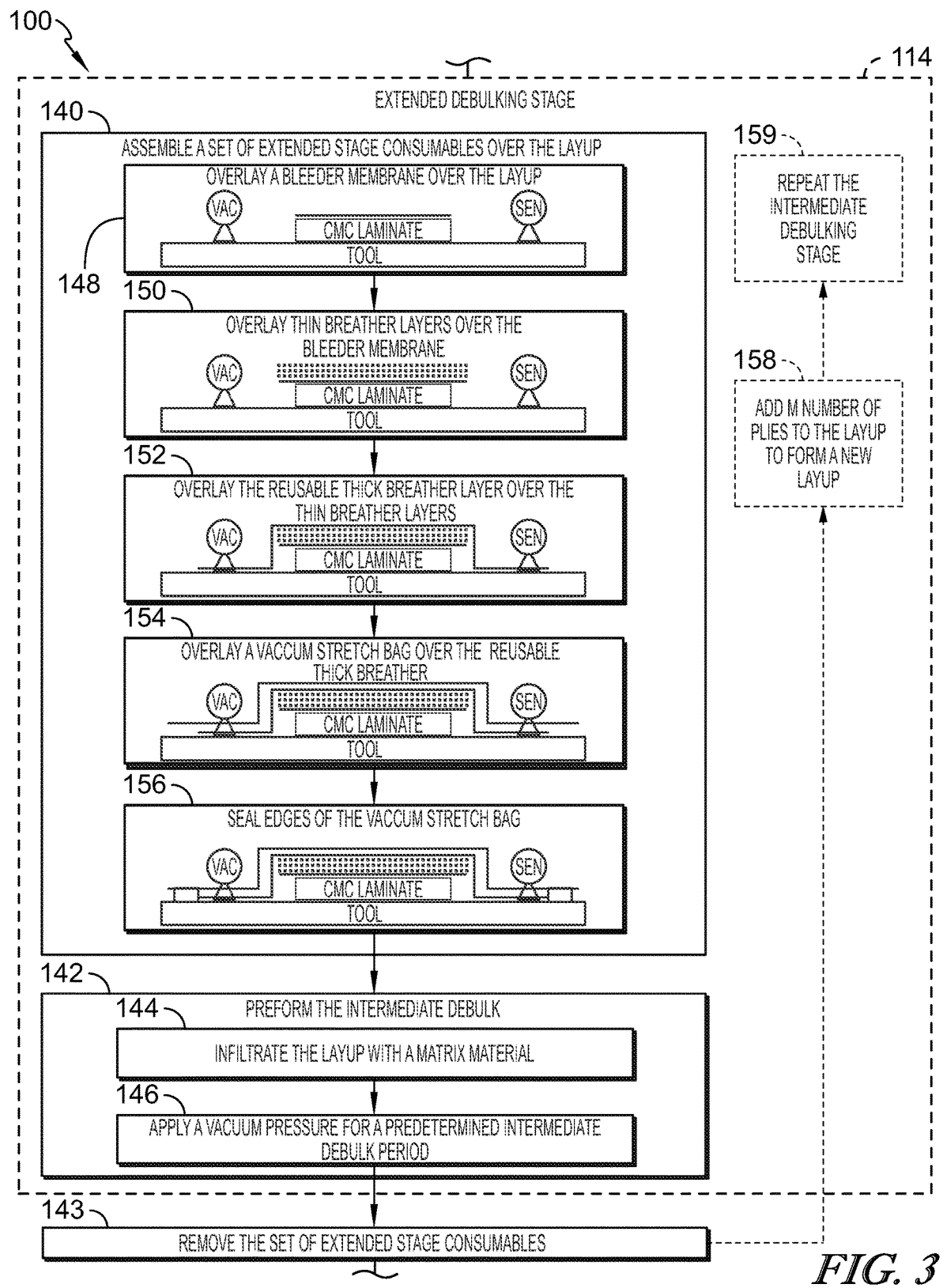
FIG. 3 is a diagrammatic view of the intermediate debulking stage of the process of FIG. 1 showing the extended debulking stage includes the steps of assembling a set of extended stage consumables over the layup and performing the extended debulk to remove excess matrix material after the intermediate debulking stage.

The extended debulking stage 114 includes the steps of assembling the set of extended stage consumables 30 over the layup 14A as suggested by block 140 and performing the extended debulk as suggested by block 142 in FIG. 3. The set of extended stage consumables 30 are assembled once the set of intermediate stage consumables 20 are removed from the layup 14A.

The extended debulk 142 includes infiltrating the layup 14A with a matrix material as suggested by block 144 and applying the vacuum pressure for a predetermined extended debulk period as suggested by block 146. The vacuum pressure is applied by the vacuum 16 to withdrawn the air between the set of extended stage consumables 30 and the layup 14A.

Figure 3A:
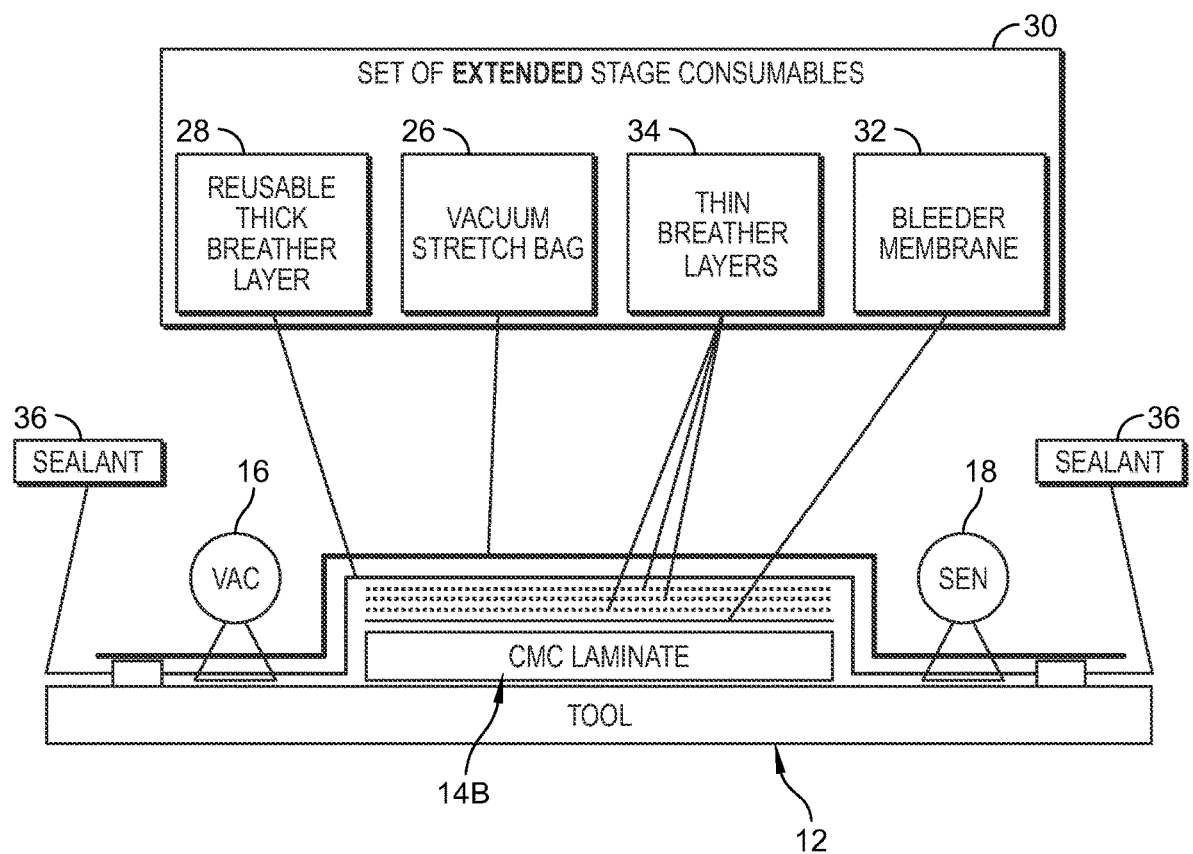
FIG. 3A is a diagrammatic view of the layup of ceramic plies on the layup tool with the set of extended stage consumables arranged over the layup showing the set of extended stage consumables includes a bleeder membrane that directly overlays an exposed surface of the layup, a plurality of thin breather layers that overlay the bleeder membrane, the reusable thick breather layer that overlays the disposable thin breather layers, and a vacuum stretch bag that overlays the reusable thick breather layer.

The step of assembling the set of extended stage consumables 30 over the layup 14A includes overlaying the different consumable layers 32, 34, 26, 28 over the layup 14A as suggested by blocks 148, 150, 152, 154 and sealing the set of extended stage consumables 30 to the layup tool 12 as suggested by block 156 in FIG. 3. The set of extended stage consumables 30 includes a bleeder membrane 32, a plurality of thin breather layers 34, the reusable thick breather layer 26, and the vacuum stretch bag 28 as shown in FIGS. 3 and 3A.

The bleeder membrane 22 is configured to allow excess matrix material to bleed therethrough as the vacuum pressure is applied so that the excess matrix material is uniformly bled in a thickness direction from the layup 14A to provide a homogenous distribution of the matrix material. The thin breather layers 34 and the thick breather layer 26 are configured to absorb excess matrix material that bleeds through the bleeder membrane 32. The vacuum stretch bag 28 is sealed to the layup tool 14 so that when the vacuum pressure is applied, the air between the set of extended stage consumables 30 and the layup 14A is withdrawn to apply the vacuum pressure.

The different extended stage consumable layers are assembled by first overlaying the bleeder membrane 32 over the exposed surface 14BS of the layup 14B as suggested by block 148. Then, the thin breather layers 34 are laid over the bleeder membrane 32 as suggested by block 150 and the reusable thick breather layer 26 is laid over the disposable thin breather layers 34 as suggested by block 152. Lastly, the vacuum stretch bag 28 is laid over the reusable thick breather layer 26 as suggested by block 154 and sealed to the layup tool 12 with sealant 36 as suggested by block 156.

After the vacuum pressure is applied to layup 14A on the layup tool 12, the vacuum pressure is held for the predetermined extended debulk period. The vacuum pressure is the same as the intermediate debulking stage 112 which is less than or equal to about −85 kPa. The predetermined extended debulk period is between about 12 to 15 hours.

After the predetermined extended debulk period, the set of extended stage consumables 30 are removed from the layup 14A by each layer as suggested by block 143. The bleeder membrane 32 needs to be removed slowly and carefully to avoid lifting the laid plies. Then, depending on the number of plies of the layup 14A as suggested by block 158, additional intermediate debulks may be repeated as suggested by block 159 in FIG. 3.

After the set of extended stage consumables 30 are removed from the layup 14A, the desired number of plies are added to the layup 14A before repeating the intermediate debulking stage 112 as suggested by block 158. Then the steps of assembling the set of intermediate stage consumables 20 over the layup 14A and performing the intermediate debulk are repeated. Several intermediate debulks may be performed like as described above after the extended debulk stage 114 until a desired final number of plies is reached as show in FIG. 5.

After the final number of plies is reached, the process 100 may include repeating the extended debulking stage 114. For the subsequent extended debulks, the vacuum stretch bag 28 and the reusable thick breather layer 26 are reused. The bleeder membrane 32 and the disposable thin breather layers 34 are not reused and instead a new bleeder membrane 32 and disposable thin breather layers 34 are assembled over the layup 14A.

The use of the bleeder membrane 22, 32 during the debulking stages 112, 114 allows through thickness bleeding of the excess matrix material over the whole surface of the component 14A, 14B. Other consumables that are less permeable produce bleeding around the component, which gives rise to a non-homogeneous distribution of the matrix material and the porosity. This results in a non-uniform component with different properties. The bleeder membrane 22, 32 is configured to evenly enable the excess matrix material to escape from the surface 14AS, 14BS of the layup 14A, 14B as the air between the vacuum stretch bag 28 and the layup 14A, 14B is vacuumed out.

Additionally, the bleeder permeable membrane 22, 32 may also have a high drapability as well as soft and low grammage of the material. Other processes that use typical consumables create a component with wrinkles and other surface defects. The high drapability and low grammage of the bleeder permeable membrane 22, 32 reduces the wrinkles and/or other surface defects.

Therefore, by overlaying the bleeder permeable membrane 22, 32 directly over the exposed surface 14AS, 14BS of the layup 14A, 14B, the excess matrix material is uniformly bled in the thickness direction as the vacuum pressure is applied. This provides a homogenous distribution of the matrix material. Additionally, the bleeder permeable membrane 22, 32 reduces the wrinkles and/or other surface defects of the resulting layup 14C.

Figure 6:
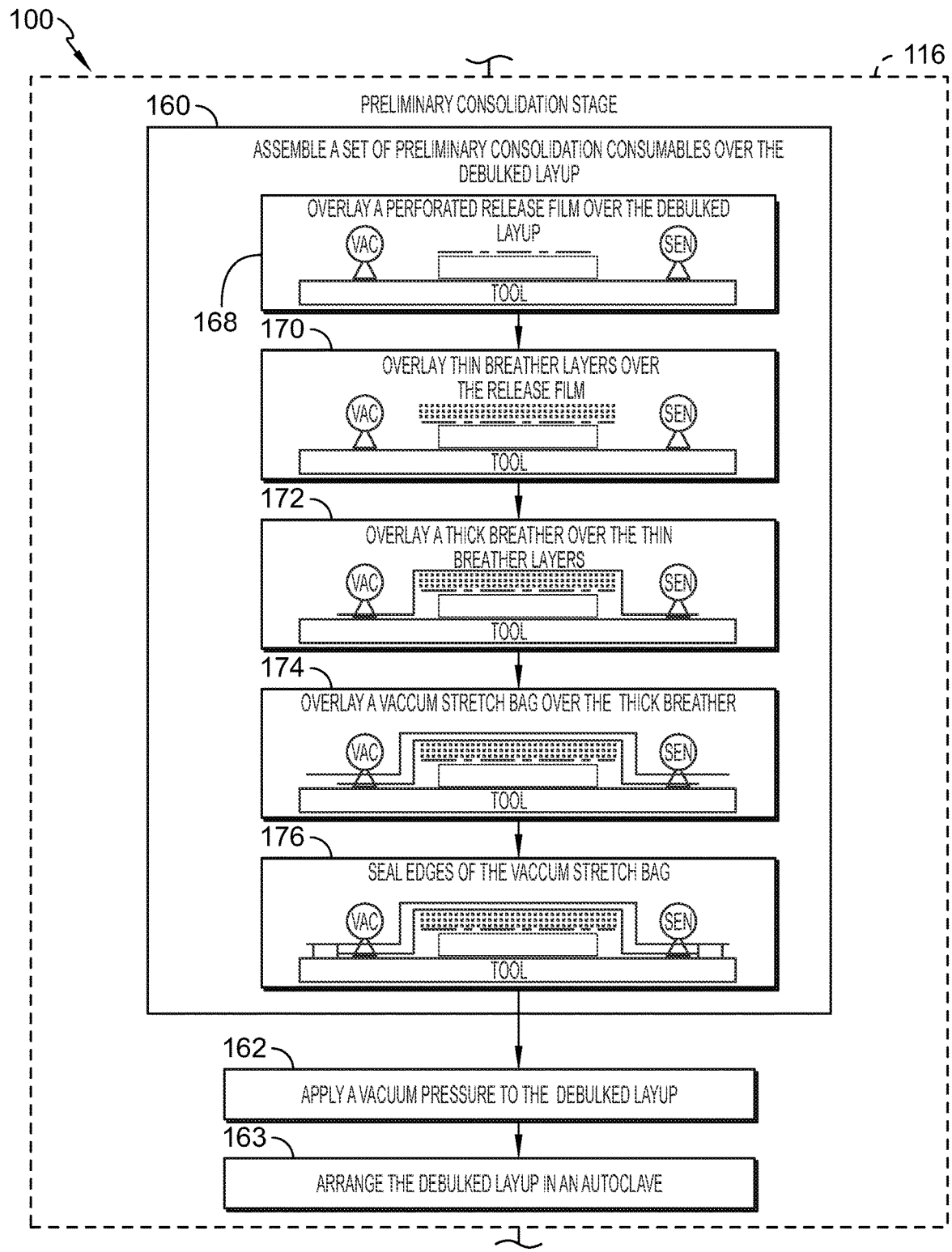
FIG. 6 is a diagrammatic view of the preliminary consolidation stage of the process of FIG. 1 showing the preliminary consolidation stage includes assembling a set of preliminary consolidation consumables over the layup before applying a vacuum pressure to the debulked layup.
Figure 7:
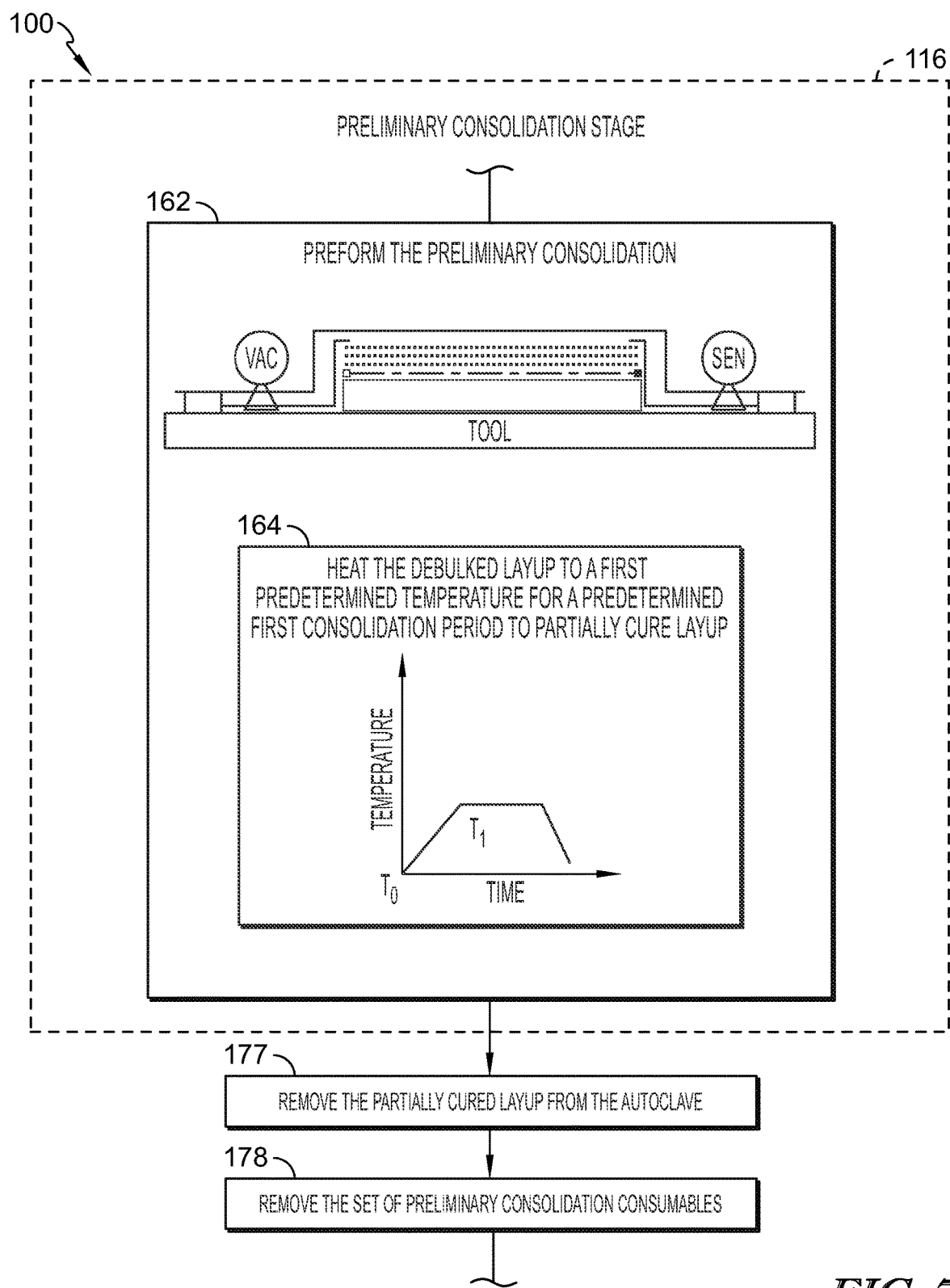
FIG. 7 is a diagrammatic view of the preliminary consolidation stage of the process of FIG. 1 showing the preliminary consolidation stage continues with heating the layup to a first predetermined temperature for a predetermined preliminary consolidation period to partially cure the layup before removing the set of preliminary consolidation consumables from the layup.

Once the intermediate and extended debulking stages 112, 114 are completed, the process 100 continues to the preliminary consolidation stage 116 as shown in FIGS. 6 and 7. The preliminary consolidation stage 116 includes assembling the set of preliminary consolidation consumables 40 over the debulked layup 14B as suggested by block 160, applying the vacuum pressure as suggested by block 162, and performing the preliminary consolidation as suggested by block 164. The vacuum pressure is applied to withdraw air between the set of preliminary consolidation consumables 40 and the layup 14B. The preliminary consolidation 164 is performed by heating the layup 14B to a first predetermined temperature $T_1$ for a predetermined preliminary consolidation period to partially cure the layup 14B as suggested by block 166.

Figure 6A:
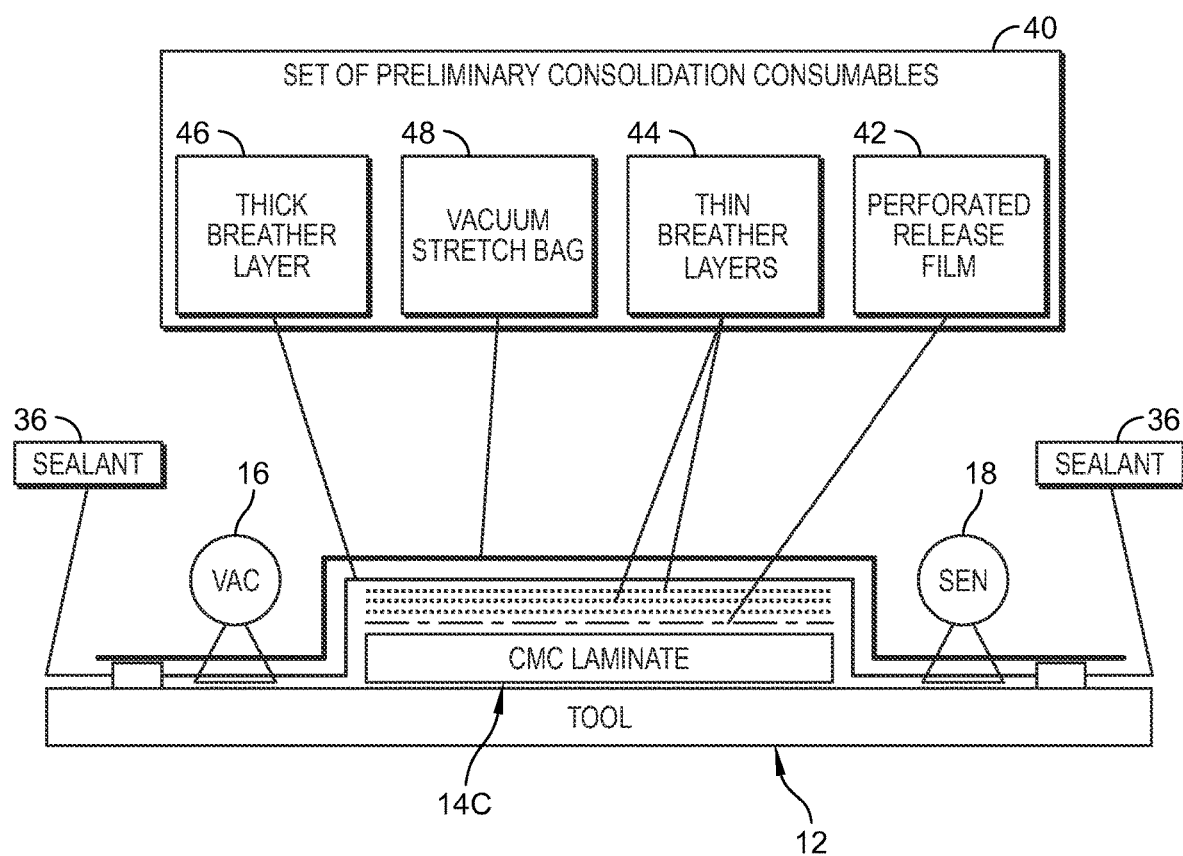
FIG. 6A is a diagrammatic view of the layup of ceramic plies on the layup tool with the set of preliminary consolidation consumables arranged over the layup showing the set of preliminary consolidation consumables includes a perforated release film layer that directly overlays an exposed surface of the layup, a plurality of thin breather layers that overlays the perforated release film, a thick breather layer that overlays the thin breather layers, and a vacuum stretch bag that overlays the thick breather layer.

The step of assembling the set of preliminary consolidation consumables 40 over the layup 14B includes overlaying the different consumable layers 42, 44, 46, 48 over the layup 14B as suggested by blocks 168, 170, 172, 174 and sealing the set of preliminary consolidation consumables 40 to the layup tool 12 as suggested by block 176 in FIG. 6. The set of preliminary consolidation consumables 40 includes a perforated release film layer 42, a plurality of thin breather layers 44, a thick breather layer 46, and a vacuum stretch bag 48 as shown in FIG. 6A.

The perforated release film layer 42, the plurality of thin breather layers 44, and the vacuum stretch bag 48 of the set of preliminary consolidation consumables 40 have a high flexibility/elongation. The perforated release film layer 42, the plurality of thin breather layers 44, and the vacuum stretch bag 48 are stretchable to apply torque to avoid creating marks, creating damage, and/or causing movement of the prepreg material.

The different preliminary consolidation consumable layers are assembled by first overlaying the perforated release film 42 layer over an exposed 14BS surface of the layup 14B as suggested by block 168. Then the plurality of thin breather layers 44 are laid over the perforated release film layer 42 as suggested by block 170 and the thick breather layer 46 is laid over the thin breather layers 44 as suggested by block 172. Lastly, the vacuum stretch bag 48 is laid over the thick breather layer 46 as suggested by block 174 and sealed to the layup tool 12 with sealant 36 as suggested by block 176.

After the set of preliminary consolidation consumables 40 are assembled over the layup 14B on the layup tool 12 and the vacuum pressure is applied, the layup 14B is arranged in an autoclave as suggested by block 163. In the autoclave, the preliminary consolidation 164 is performed as suggested in FIG. 7.

The preliminary consolidation 164 includes heating the layup 14B to the first predetermined temperature $T_1$ for the predetermined preliminary consolidation period as suggested by block 166. The heating step 168 includes increasing the temperature of the heat applied to the layup 14B from an initial temperature $T_0$ to the first predetermined temperature $T_1$, maintaining the first predetermined temperature $T_1$ for the predetermined preliminary consolidation period, and decreasing the heat applied to the layup 14B back to the initial temperature $T_0$ after the predetermined preliminary consolidation period as suggested in FIG. 7. The preliminary consolidation 164 forms a partially cured layup 14C that is not fully cured, but harder than the original layup 14B.

After the layup 14C has cooled, the partially cured layup 14C is removed from the autoclave as suggested by block 177 in FIG. 7. Then, the set of preliminary consolidation consumables 40 is removed from the layup 14C as suggested by block 178 in FIG. 7.

Figure 8:
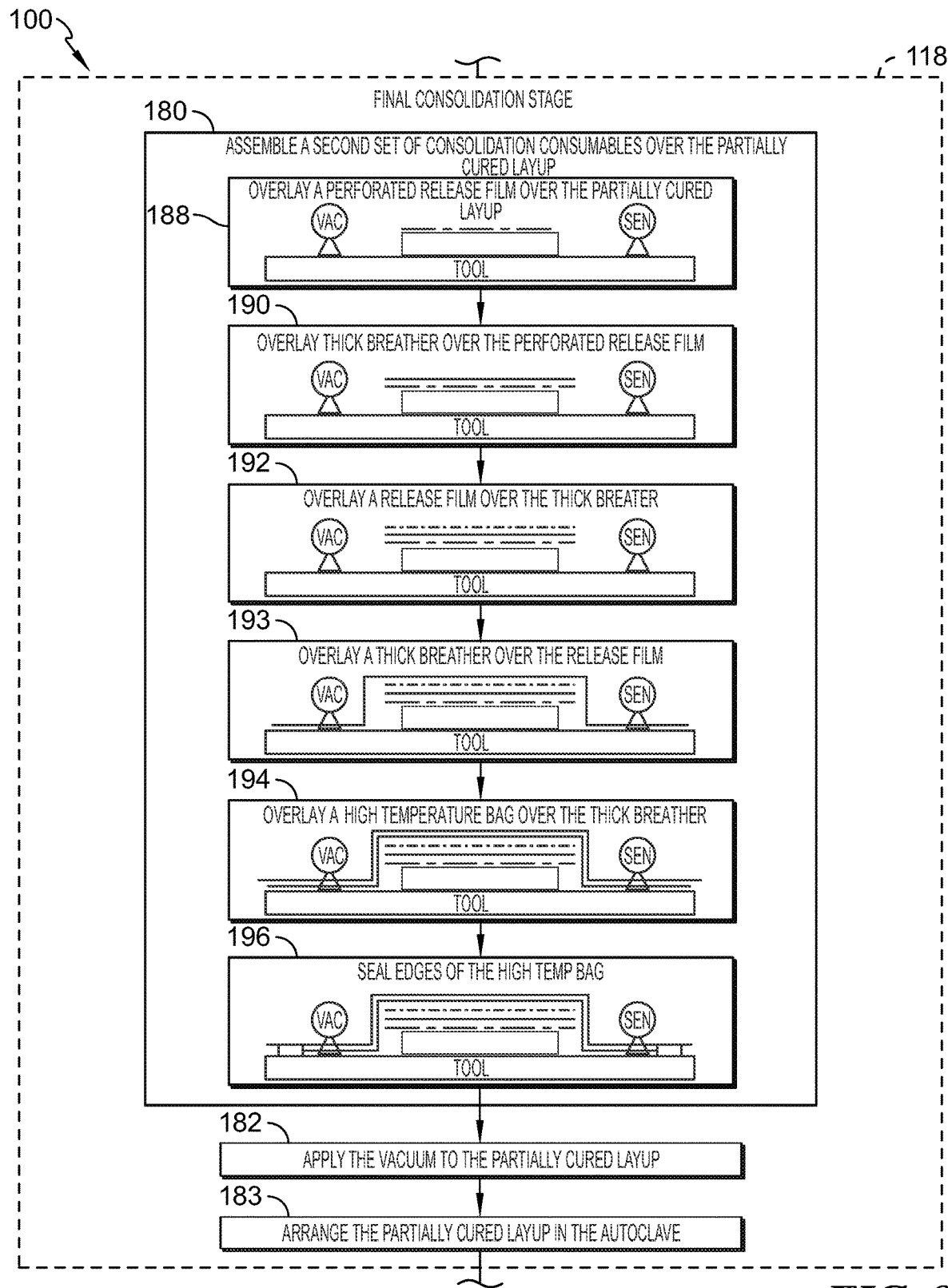
FIG. 8 is a diagrammatic view of the final consolidation stage of the process of FIG. 1 showing the final consolidation stage includes assembling a set of final consolidation consumables over the layup before applying a vacuum pressure to the partially cured layup.
Figure 9:
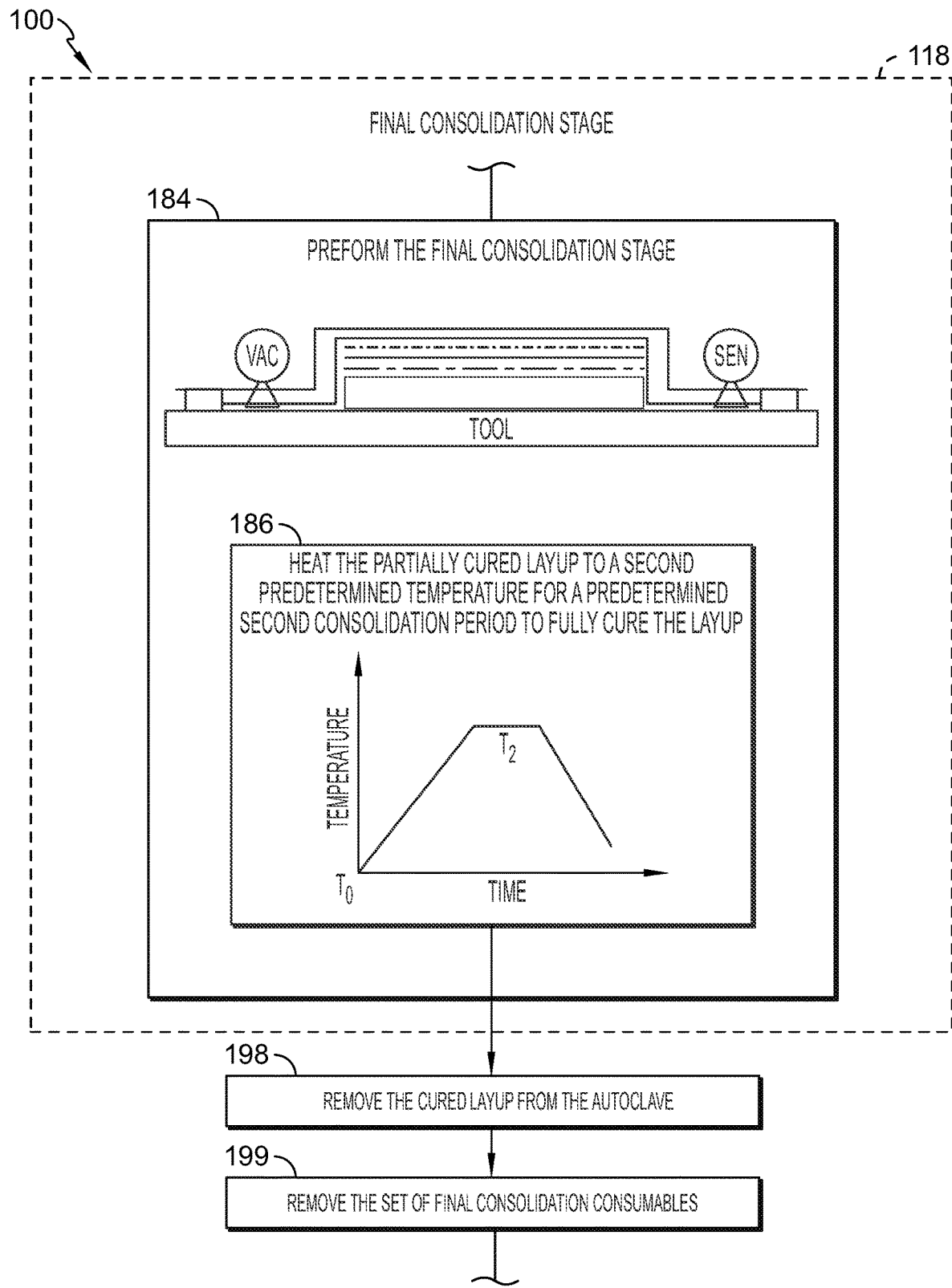
FIG. 9 is a diagrammatic view of the final consolidation stage of the process of FIG. 1 showing the final consolidation stage continues with heating the layup to a second predetermined temperature for a predetermined final consolidation period to fully cure the layup.

The process 100 then proceeds to the final consolidation stage 118 as shown in FIGS. 8 and 9. The final consolidation stage 118 includes assembling the set of final consolidation consumables 50 over the partially cured layup 14C as suggested by block 180, applying the vacuum pressure as suggested by block 182, and performing the final consolidation as suggested by block 184. The vacuum pressure is applied to withdraw air between the set of final consolidation consumables 50 and the layup 14C. The final consolidation 184 is performed by heating the layup 14C to a second predetermined temperature $T_2$ for a predetermined final consolidation period to fully cure the layup 14C as suggested by block 186.

Figure 8A:
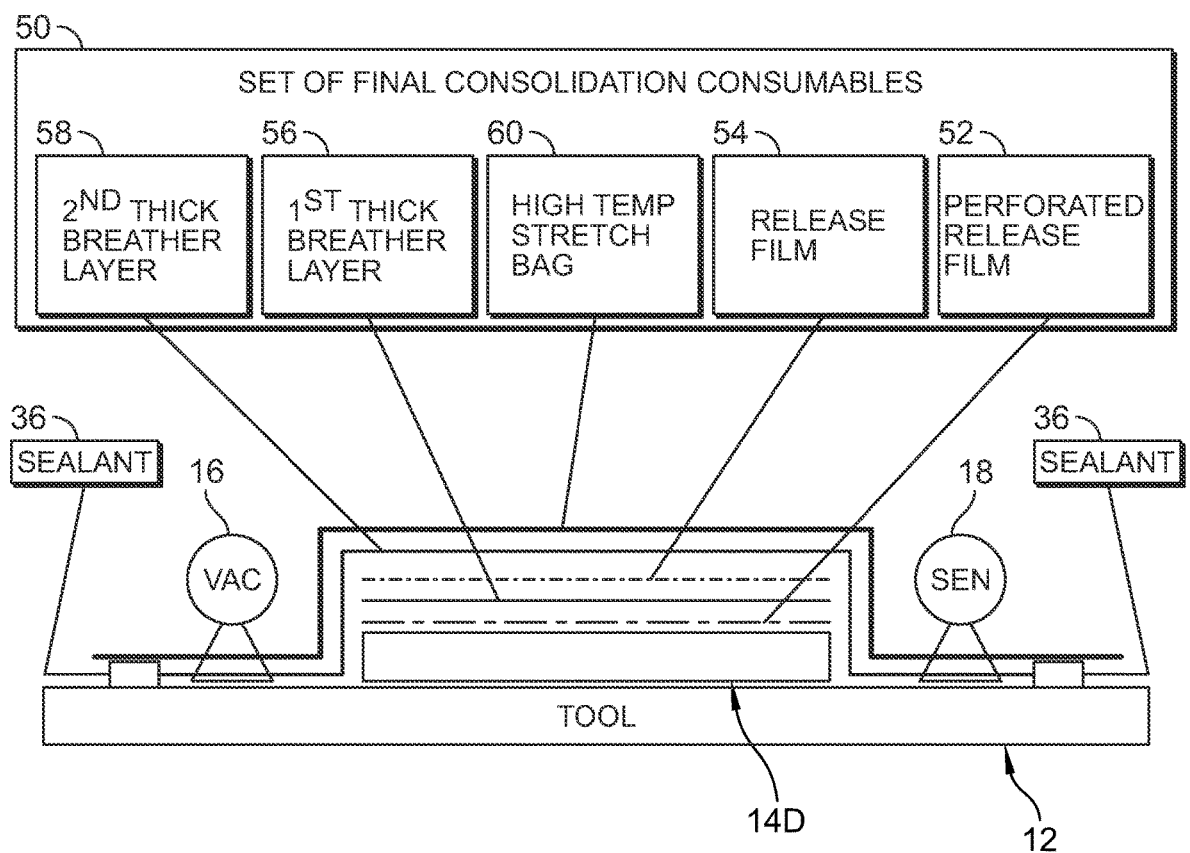
FIG. 8A is a diagrammatic view of the layup of ceramic plies on the layup tool with the set of final consolidation consumables arranged over the layup showing the set of final consolidation consumables includes a perforated release film layer that directly overlays an exposed surface of the layup, a first thick breather layer that overlays the perforated release film, a release film layer that overlays the first thick breather layer, a second thick breather layer that overlays the release film layer, and a vacuum stretch bag that overlays the second thick breather layer.

The step of assembling the set of final consolidation consumables 50 over the layup 14C includes overlaying the different consumable layers 52, 54, 46, 48 over the layup 14B as suggested by blocks 188, 190, 192, 193, 194 and sealing the set of final consolidation consumables 50 to the layup tool 12 as suggested by block 196 in FIG. 8. The set of final consolidation consumables 50 includes a perforated release film layer 52, a release film layer 54, first and second thick breather layers 56, 58, and a high-temperature stretch bag 60 as shown in FIG. 8A.

The perforated release film layer 52, the release film layer 54, the first and second thick breather layers 56, 58, and the high-temperature stretch bag 60 of the set of final consolidation consumables 50 have a high temperature capability compared to the set of preliminary consolidation consumables 40. Because the final consolidation 184 includes by heating the layup 14C to the second predetermined temperature $T_2$, which is greater than the first predetermined temperature $T_1$, the set of final consolidation consumables 50 needs to be able to withstand high temperature heat.

The different final consolidation consumable layers are assembled by first overlaying the perforated release film layer 52 over the exposed surface 14CS of the layup 14C as suggested by block 188. Then the first thick breather layer 56 is laid over the perforated release film layer 52 as suggested by block 190 and the release film layer 54 is laid over the first thick breather layer 56 as suggested by block 192. Next, the second thick breather layer 58 is laid over the release film layer 54 as suggested by block 193 and the high-temperature stretch bag 60 is laid over the second thick breather layer 58 as suggested by block 194. The high-temperature stretch bag 60 is then sealed to the layup tool 12 with sealant 36 as suggested by block 196.

After the set of final consolidation consumables 52 are assembled over the layup 14C on the layup tool 12 and the vacuum pressure is applied, the layup 14C is arranged in the autoclave as suggested by block 183. In the autoclave, the final consolidation 184 is performed as suggested in FIG. 9.

The final consolidation 184 includes heating the layup 14C to the second predetermined temperature $T_2$ for the predetermined preliminary consolidation period as suggested by block 186. The heating step 186 includes increasing the temperature of the heat applied to the layup 14C from the initial temperature $T_0$ to the second predetermined temperature $T_2$, maintaining the second predetermined temperature $T_2$ for the predetermined final consolidation period, and decreasing the heat applied to the layup 14C back to the initial temperature $T_0$ after the predetermined final consolidation period as suggested in FIG. 9. The final consolidation 184 forms a fully cured layup 14D.

The second predetermined temperature $T_2$ is greater than the first predetermined temperatures $T_1$ such that the set of final consolidation consumables 50 has a higher temperature capability to withstand the higher temperature. By splitting the consolidation into the preliminary and final consolidation stages 116, 118, the different sets of consumables 40, 50 may be used at the different stages 116, 118 to cater to the needs of the layup at each of the stages 116, 118.

Additionally, the predetermined preliminary consolidation period is equal to the predetermined final consolidation period. In other embodiments, the predetermined preliminary consolidation period may be less than or greater than the predetermined final consolidation period.

In the illustrative embodiment, the temperature increase at both the preliminary and final consolidation stages 116, 118 is the same. In other embodiments, the temperature increase at the preliminary consolidation stage 116 may be less than or greater than the rate at which the temperature at the final consolidation stage 118 is increased.

After the layup 14D has cooled, the fully cured layup 14D is removed from the autoclave as suggested by block 198 in FIG. 9. Then, the set of final consolidation consumables 50 is removed from the layup 14D as suggested by block 199 in FIG. 9.

The process 100 includes the use of a bleeder permeable membrane 22, 32 in the debulking of an oxide-oxide ceramic matrix composite (CMC) prepreg laid material 14A, 14B prior to cure to allow through thickness bleeding of the excess matrix over the whole surface of the component. Other consumables that are less permeable produce bleeding around the component giving rise to a non-homogeneous distribution of the matrix and the porosity. This results in a non-uniform component with different properties.

The bleeder permeable membrane 22, 32 may also have a high drapability as well as soft and low grammage of the material. Other processes that use typical consumables create a component with wrinkles and other surface defects. The high drapability and low grammage of the bleeder permeable membrane 22, 32 reduces the wrinkles and/or other surface defects.

The process 100 produces ceramic matrix composite component from Ox-Ox CMC prepreg material. The components may be exhaust components and/or heatshields.

In other embodiments, the ceramic plies are simply stacked prior to a final consolidation cycle (application of high pressure and temperature) to compact and dry the material into a solid (green state) preform. The voids and excess matrix material are removed in the consolidation.

However, the process 100 includes the use of a bleeder permeable membrane 22, 32 in the debulking stages 112, 114 of the process 100 of components. Ceramic matrix composite materials generally comprise a ceramic fiber reinforcement material embedded in a ceramic matrix material. The reinforcement material may serve as the load-bearing constituent of the CMC in the event of a matrix crack, while the ceramic matrix protects the reinforcement material, maintains the orientation of its fibers, and serves to dissipate loads to the reinforcement material.

The maximum and optimal properties of the composite material may be achieved with the composition 42-51 vol % fiber, 32-38 vol % matrix. The use of the bleeder permeable membrane 22, 32 helps to reduce the excess of matrix in the early stage of the process avoiding substantial thickness reduction from pre- to post consolidation stages 116, 118, thereby obtaining a final composite material with the composition 47 vol % fiber, 33 vol % matrix and 20 vol % porosity. Due to a through thickness bleeding across the entire surface of the layup 14A, 14B, the porosity may be homogeneously distributed and the prepreg component well consolidated with <5 vol % macroporosity.

To remove matrix material, the matrix material may be 'bled' in a controlled and uniform manner. For aqueous ceramic matrix composite materials, bleeding needs to occur in the thickness direction rather than from the edges to achieve the desired microstructure and subsequent material properties. Non-uniform bleeding of the prepreg material may produce a non-homogeneous distribution of the matrix and the porosity.

The intermediate and extended debulking stages 112, 114 are done to bleed the matrix material from the layup 14A, 14B. As discussed, other embodiments, simply stack plies of ceramic material prior to consolidating the preform and rely on the consolidation to remove voids and excess matrix material.

However, the matrix material may be accumulated in some complex shapes (e.g. over a female radii) and dry patches in other areas (e.g. over a male radii). In some embodiments, this may be remedied through the use of intensifiers (also referred to as caul plates/tools or overpresses), which aim to increase the applied pressure in fiber bridged areas. Essentially, the intensifiers try to force the matrix to bleed around the layup.

This is complex and costly as it uses additional special tooling and all of the added maintenance thereof. Additionally, different properties may be expected in the component with low control on this, due to movement of the matrix from central areas to the periphery. There may also be undesirable consequences relating to the flow of the matrix material and often a detrimental impact to the surface finish achieved.

The process 100 fixes this problem having worked out a means of the use of a bleeder permeable membrane 22, 32 (used in the debulking stages 112, 114) to evenly enable slurry to escape from the material surface 14AS, 14BS and allow compaction of the fiber stack of the layup 14A, 14B.

Enabling the slurry/matrix material to bleed includes the placement of the bleeder permeable membrane 22, 32 directly on the material surface 14AS, 14BS. The bleeder membrane 22, 32 needs to be permeable, drapable, and removable.

The bleeder membrane 22, 32 needs to have a high permeability, i.e. the ability to transmit the fluid has a direct relation with the porosity of the membrane. The bleeder membrane 22, 32 needs to have a high drapability, i.e. the ability to conform to the geometry of the layup 14A, 14B without bridging or wrinkling as wrinkling may reduce permeability locally and deteriorate surface finish. The bleeder membrane 22, 32 needs to be easily removed such that it does not adhere to the layup 14A, 14B and contaminate the material surface 14AS, 14BS. The grammage/permeability of the bleeder membrane 22, 32 may be modified depending on the physical and chemical characteristics of the matrix; i.e. viscosity, flow, matrix fluid medium, amount of matrix.

The bleeder membrane 22, 32 may be one of Ultra-light glass cloth (UG) (Easy Composites), Stretch Flow 2000 (SF) (Airtech), Release ease 234 TFP (RE) (Tygavac), and Perforated Release Film A4000R (PRF)-P3 (Airtech). After testing, the ultra-light glass cloth has the best permeability, drapability, and removability. In the illustrative embodiment, the bleeder membrane 22, 32 is a E-glass fiber cloth plain weave, 25 g/m 2 grammage and 0.04 mm thickness. The bleeder membrane 22, 32 has no added supporting net or coating and therefore the bleeder membrane 22, 32 remains very flexible, i.e. tight curves and corners do not present a problem in terms of getting the bleeder membrane 22, 32 to conform without hard wrinkles that could pinch/mark the prepreg material.

The bleeder permeable membrane 22, 32 is placed directly on the layup 14A, 14B before the intermediate and extended debulks 122, 142 of the intermediate and extended debulking stages 112, 114. A new bleeder permeable membrane 22, 32 is used for each intermediate and extended debulk 122, 142.

The bleeder permeable membrane 22, 32 has to cover the layup plus a minimum of 20 mm on all sides. The bleeder permeable membrane 22, 32 should be laid loosely, not tight, without wrinkles or folds, and no fiber bridging on the glass fiber of the bleeder membrane 22, 32 on internal recesses on the layup tool 12.

The bleeder permeable membrane 22, 32 is free of any release agent in the illustrative embodiment. The bleeder permeable membrane 22, 32 is not coated in a release agent so that it may keep its desired flexibility. Because the bleeder membrane 22, 32 is not coated with any release agent, after the intermediate/extended debulks 122, 142, the bleeder membrane 22, 32 needs to be removed slowly and carefully to avoid lifting prepreg material, as material could be lifted if the bleeder membrane 22, 32 was removed energetically.

The advantage of using the bleeder permeable membrane 22, 32 in the debulking of an oxide-oxide ceramic matrix composite (CMC) prepreg laid material is to obtain components free of defects and to control of the porosity over the entire component. By controlling the removal of excess matrix through the material thickness over the entire surface of the component, the laying surface is kept as close to its final position thereby minimizing the bulk.

The through thickness bleeding also helps to obtain a better consolidation of the part at the preliminary and final consolidation stages 116, 118. Additionally the through thickness bleeding also helps rise the fiber volume in the composite structure and creates a homogeneous distribution of the matrix and porosity in the subsequent cure stage without the use of intensification tools/aids.

The intermediate and extended debulking stages 112, 114 of the process 100 help avoid fiber bridging and wrinkling in complex layup geometries. Typically, debulking processes do not include intermediate debulks 122 for ceramic matrix composite prepreg materials and hence are prone to these defects. Furthermore, the process 100 does not use additional intensifier tooling.

As discussed above, others simply stack material (plies). Laying material produces a thickness that is above the intended final thickness hence the need for debulking. The difference between pre- and post-consolidated thickness is called bulk.

Laying more material on top of material that has too much bulk leads to fiber lengths being too long (e.g. over a male radii) or too short (e.g. over a female radii). This may lead to fiber wrinkling or fiber bridging. In some embodiments, intensifiers (also referred to as caul plates/tools or overpresses) may be used to remedy this. The intensifiers may aim to increase the applied pressure in fiber-bridged areas and force the fibers/material into position.

This may be complex and costly as additional special tooling may be needed. Moreover, it is common for these intensifier tools to crack. In severe cases, the use of intensifiers may lead to breakage/damage of the fibers. There may also be undesirable consequences relating to the flow of the slurry/matrix and often a detrimental impact to the surface finish achieved.

This intermediate debulking stage 112 regularly removes bulk to keep the bulk as low as possible during layup such that the fiber lengths are as close to the final target as possible. In doing so, this removes any need for additional intensifier tooling making the manufacturing process simpler and more cost efficient. The intermediate debulking stage 112 is possible using the bleeder permeable membrane 22 during the intermediate debulking 122.

Ceramic matrix composite materials generally comprise a ceramic fiber reinforcement material embedded in a ceramic matrix material. The reinforcement material serves as the load-bearing constituent of the ceramic matrix composite in the event of a matrix crack, while the ceramic matrix protects the reinforcement material, maintains the orientation of its fibers, and serves to dissipate loads to the reinforcement material.

Ceramic matrix composites may be categorized as being either oxide-based or nonoxide-based. The microstructure of an oxide composite may be tailored to yield a microporous matrix that does not require the use of fiber interface coatings in order to produce damage tolerance characteristic. In addition, oxide-based ceramics may be inherently more environmentally stable in oxidizing environments than non-oxide-based ceramics. Accordingly, oxide-based ceramics may be well suited for gas turbine engine components such as combustors, transition ducts, vanes and other structures subject to high temperature environments.

Whilst all the patents related to this topic refer to desired porosity, none of them introduce porosity distribution and the effect that it can have in the material. The non-uniform distribution of the porosity due to poor consolidation, fiber bridging and wrinkling defects in the components has not been mention although these defects are the most common working with prepreg.

The process 100 allows control, reduction and uniform distribution of the macroporosity, even in the complex shapes where fiber bridging and wrinkling defects are prone to appear. The intermediate and extended debulking stages 112, 114 during the lay-up step of the prepreg material produces improved control of part form (shape) and an improved consolidation of the stack of the plies reducing the thickness of the laminate prior to cure. The total porosity of the composite is 20% of which <5% is macroporosity. The control of the macroporosity is the key parameter in the consolidation stage of the manufacture process. A high volume of macroporosity either triggers or makes the material more susceptible to delamination.

In other embodiments, the porosity of the material may not be measured in situ during the lay-up step and debulking. However, the thickness of the laminate may provide information comparable with the cure ply thickness (CPT) and nominal cure thickness (NCT) given by the supplier. The ratio of the laid-up material thickness to NCT gives us the expected bulk factor. Parts free of defects show a bulk ~15%. The intermediate and extended debulking stages 112, 114 give a control in the porosity, compaction and parts free of defects.

In the illustrative embodiment, the intermediate and extended debulking stages 112, 114 are for a 16 ply thick laminate (~3.2 mm). Therefore, the intermediate debulking stage 112 includes nine intermediate debulks 122 and the extended debulking stage 114 includes two extended debulks 142 in the illustrative embodiment as shown in FIG. 5.

Intermediate debulks 122 keep bulk low and fiber lengths correct, while the extended debulks 142 even out the bulk distribution over features. This is given that the features themselves can have a pressure intensifying effect.

The intermediate debulking stage 112 beings after the first ply of ceramic material, after the second ply, and then after every two plies, i.e. 1, 2, 4, 6, 8, etc. as shown in FIGS. 4 and 5. However, the order of intermediate debulks 122 may vary.

After a certain number of plies, with the material on the layup tool, the set of intermediate stage consumables 20 is assembled on the exposed surface 14AS. The vacuum stretch bag 28 is assembled over the top and the edges sealed to the layup tool 12. The vacuum stretch bag 28 is then evacuated to squeeze and consolidate the material against the layup tool 12.

The predetermined intermediate debulk period is greater than or equal to about 15 minutes regardless if one or two plies have been laid. The predetermined intermediate debulk period may be ±one minute.

The vacuum level must be less than or equal to −85 kPa (−25 inHg). In the illustrative embodiment, two vacuum ports are used (one for the vacuum hose connection 16 and the other for the vacuum gauge 18). The vacuum hose 16 is connected for 15 min of debulking. The leak rate is less than about 2 kPa/min (0.6 inHg/min).

The set of intermediate stage consumables 20 is shown in FIG. 2A. The bleeder membrane 22 is new for each intermediate debulk 122. The thick breather layer 24 on the bleeder membrane 22 is reused twice and the second thick breather layer 26 is reused for all the debulking like the vacuum stretch bag 28.

The extended debulking stage 114 is carried out after the eighth ply and after the sixteenth ply. In both cases, the extended debulking stage 114 is after the intermediate debulking stage 112 as shown in FIG. 5.

The layup 14B is left under vacuum between 12-16 hours. The vacuum level may be less than or equal to −85 kPa (−25 inHg). Two vacuum ports are used (one for the vacuum hose connection 16 and the other for the vacuum gauge 18). The vacuum hose 16 is disconnected after the first 10 min of extended debulking 142. The leak rate is less than about 2 kPa/min (0.6 inHg/min).

The set of extended stage consumables 30 is shown in FIG. 3A. The advantage of the intermediate and extended debulking stages 112, 114 of the process 100 for ceramic matrix composite prepreg is to obtain components free of defects (i.e. fiber bridging, wrinkling, delamination due to a better consolidation of the part in the subsequent preliminary and final consolidation stages 116, 118) and components with low porosity (20% total, <5% macro-). The intermediate and extended debulking stages 112, 114 eliminate the need for intensification tools/aids. Additionally, the compaction of the prepreg material by vacuum every two plies removes excess matrix to keep each laying surface (ply interface) close to its final position (minimal bulk) such that the fiber lengths are correct.

In some embodiments, the consolidation process for Ox-Ox ceramic matrix composite prepreg materials is a continuous process with a gradual heating rate from dwell at a first predetermined temperature to dwell at a second predetermined temperature. However, the material showed different characteristics at each temperature.

The material may be prone to be printable, marked and damage with the folds and pleats of the consumables produced during the bagging process from room temperature to the first temperature. After the dwell at the first temperature, the material is not fully dry/consolidated but it is harder, and the folds of the consumables do not affect the material.

The process 100 therefore splits consolidation into the preliminary consolidation stage 116 and the final consolidation stage 118. The preliminary consolidation stage 116 includes heating the layup 14C to the first predetermined temperature $T_1$ and the set of preliminary consolidation consumables 40 is used. The set of preliminary consolidation consumables 40 is composed of stretchable or flexible consumables to apply torque to avoid creating marks, creating damage, and/or causing movement of the prepreg material.

After the preliminary consolidation stage 116, the final consolidation stage 118 includes heating the layup 14D to the second predetermined temperature $T_2$ where high temperature consumables are needed and the amount of stretching needed is more relaxed. Therefore, the final consolidation stage 118 includes the use of the set of final consolidation consumables 50.

The component is bagged for the preliminary consolidation stage 116 with the set of preliminary consolidation consumables 40, then the layup 14C goes into the autoclave for the preliminary consolidation 164 at $T_1$. Once this cycle finishes, all the set of preliminary consolidation consumables 40 are removed and the component is re-bagged for final consolidation stage 118 with the set of final consolidation consumables 50. Finally, the layup 14D goes to the autoclave for the final consolidation 184 at $T_2$.

The Ox-Ox ceramic matrix composite prepreg material is consolidated by an autoclave forming process to obtain high-quality materials. The control of the pressure and temperature allows the material compressed thereby obtaining the porosity level required. The vacuum enables the gases produced during the drying of the material to be removed. The material goes through different phases during curing, modifying its characteristics. The consumables used for bagging the material before introduced in the autoclave, need to adapt and meet the requirements of the material in each phase to obtain parts free of defects. The selection of the consumables will be different depending on the needs of the material.

The material is consolidated at two different temperatures, $T_1$ and $T_2$, where $T_1$ is lower than $T_2$. Other embodiments include a single stage consolidation process where after dwell at $T_1$, the temperature is ramped up gradually up to $T_2$. This process works for flat components, but may produce defects in complex shapes.

The material is prone to be printable, marked and damage with the folds and pleats of the consumables produced during the bagging process from room temperature to $T_1$. After the dwell at $T_1$, the material is not fully dry/consolidated but it is harder, and the folds of the consumables do not affect the material. Therefore, the process 100 includes a preliminary consolidation stage 116 and a final consolidation stage 118 that adjust the consumables used to meet the different needs of the material.

The ceramic matrix composite prepreg consolidation includes the preliminary consolidation stage 116 and the final consolidation stage 118. The preliminary consolidation stage 116 and the final consolidation stage 118 involve drying the material under pressure at two different temperatures. The preliminary consolidation stage 116 includes drying the layup 14C at the first predetermined temperature $T_1$, with the final consolidation stage 118 includes drying the layup 14D at the second predetermined temperature $T_2$. This improves the quality of the component by the selection of different consumables able to be adapted to the needs of the material at each temperature avoiding the appearance of defects due to the folds and pleats of the consumables that pinch the material.

The set of preliminary consolidation consumables 40 used for bagging the material in the autoclave are stretchy to apply torque avoiding marks, damage, and movement of the prepreg material. The set of preliminary consolidation consumables 40 is shown in FIG. 6A. The perforated release film 42, thin breather layers 44, and stretch bag 48 are consumables with high elongation, used in applications where a higher softness is needed.

Once the preliminary consolidation stage 116 is finished, the component is taken out from the autoclave and all the consumables used in this stage 116 are removed. The set of preliminary consolidation consumables 40 are not to be reused. Immediately, the component is re-bagged with the set of final consolidation consumables 50.

The final consolidation stage 118 occurs at a high temperature for a full consolidation of the material. The pressure applied in both the preliminary and final consolidation stages 116, 118 is the same. After preliminary consolidation stage 116 at $T_1$, the material is not fully dry/consolidated, but it is harder, and the folds of the consumables do not affect the material. Therefore, the set of final consolidation consumables 50 applied in the final consolidation stage 118 are recommended for application where high temperature and pressure are needed. The set of final consolidation consumables 50 is shown in FIG. 8A.

Once the final consolidation stage 118 is finished, the component is taken out from the autoclave and all the consumables used are removed. The set of final consolidation consumables 50 are not reusable. The component is fully consolidated after the final consolidation stage 118. The advantage of the preliminary and final consolidation stages 116, 118 for ceramic matrix composites prepreg is to obtain components free of defects due to the customized selection of consumable pack used for each stage accordingly with the characteristics of the prepreg material at the different temperatures during the process in autoclave.

For the purposes of the present disclosure, the modifier about means±1% of the given value. Of course, greater or lesser deviation is contemplated and may be used in processed method within the spirit of this disclosure.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

What is claimed is:

1. A method comprising: arranging a layup of a predetermined number of impregnated ceramic plies on a layup tool, performing a preliminary consolidation stage comprising: assembling a set of preliminary consolidation consumables over the layup, applying a vacuum pressure to withdraw air between the set of preliminary consolidation consumables and the layup, and heating the layup to a first predetermined temperature for a predetermined preliminary consolidation period to partially cure the layup, performing a final consolidation stage comprising: assembling a set of final consolidation consumables over the layup once the set of preliminary consolidation consumables are removed from the layup, the set of final consolidation consumables having a lower flexibility and a higher temperature capability than the set of preliminary consolidation consumables, applying a vacuum pressure to withdraw air between the set of final consolidation consumables and the layup, and heating the layup to a second predetermined temperature greater than the first predetermined temperature for a predetermined final consolidation period to fully cure the layup, wherein the set of preliminary consolidation consumables includes a perforated release film layer, a plurality of thin breather layers, a thick breather layer, and a vacuum stretch bag and wherein assembling the set of preliminary consolidation consumables over the layup comprises overlaying the perforated release film layer directly over an exposed surface of the layup, overlaying the plurality of thin breather layers directly over the perforated release film layer, overlaying the thick breather layer directly over the thin breather layers, and overlaying the vacuum stretch bag directly over the thick breather layer, and wherein the set of final consolidation consumables includes a perforated release film layer, a release film layer, first and second thick breather layers, and a high-temperature stretch bag and wherein assembling the set of final consolidation consumables over the layup comprises overlaying the perforated release film layer directly over an exposed surface of the layup, overlaying the first thick breather layer directly over the perforated release film layer, overlaying the release film layer directly over the first thick breather layer, overlaying the second thick breather layer directly over the release film layer, and overlaying the high-temperature stretch bag directly over the second thick breather layer.

2. The method of claim 1, wherein heating the layup to the first predetermined temperature for the predetermined preliminary consolidation period includes increasing the temperature of the heat applied to the layup from an initial temperature to the first predetermined temperature, maintaining the first predetermined temperature for the predetermined preliminary consolidation period, and decreasing the heat applied to the layup back to the initial temperature after the predetermined preliminary consolidation period.

3. The method of claim 2, wherein heating the layup to the second predetermined temperature for the predetermined final consolidation period includes increasing the temperature of the heat applied to the layup from the initial temperature to the second predetermined temperature, maintaining the second predetermined temperature for the predetermined final consolidation period, and decreasing the heat applied to the layup back to the initial temperature after the predetermined final consolidation period.

4. The method of claim 3, wherein the predetermined preliminary consolidation period is equal to the predetermined final consolidation period.

5. The method of claim 4, wherein the temperature of the heat applied to the layup is increased at the same rate during the preliminary consolidation stage and the final consolidation stage.

6. The method of claim 4, wherein the vacuum pressure is the same at the preliminary consolidation stage and the final consolidation stage.

7. A method comprising arranging a layup of a predetermined number of prepreg ceramic plies on a layup tool; performing an intermediate debulk stage comprising the steps of: assembling a set of intermediate stage consumables over the layup, infiltrating the layup with a matrix material, and applying a vacuum pressure for a predetermined intermediate debulk period to withdraw air between the set of intermediate stage consumables and the layup to bleed excess matrix material over an entire surface of the layup; performing an extended debulk stage comprising the steps of: assembling a set of extended stage consumables over the layup once the set of intermediate stage consumables are removed from the layup, the set of extended stage consumables is different from the set of intermediate stage consumables, infiltrating the layup with the matrix material, and applying a vacuum pressure for a predetermined extended debulk period that is greater than the predetermined intermediate debulk period to withdraw air between the set of extended stage consumables and the layup to bleed excess matrix material over the entire surface of the layup; performing a preliminary consolidation stage comprising: assembling a set of preliminary consolidation consumables over the layup, applying a vacuum pressure to withdraw air between the set of preliminary consolidation consumables and the layup, and heating the layup to a first predetermined temperature for a predetermined preliminary consolidation period to partially cure the layup, performing a final consolidation stage comprising: assembling a set of final consolidation consumables over the layup once the set of preliminary consolidation consumables are removed from the layup, the set of final consolidation consumables having a lower flexibility and a higher temperature capability than the set of preliminary consolidation consumables, applying a vacuum pressure to withdraw air between the set of final consolidation consumables and the layup, and heating the layup to a second predetermined temperature greater than the first predetermined temperature for a predetermined final consolidation period to fully cure the layup.

8. The method of claim 7, wherein the set of intermediate stage consumables includes a bleeder membrane configured to allow excess matrix material to bleed therethrough as the vacuum pressure is applied so that the excess matrix material is uniformly bled in a thickness direction from the layup to provide a homogenous distribution of the matrix material, a disposable thick breather layer configured to absorb excess matrix material, a reusable thick breather layer configured to absorb excess matrix material, and a vacuum stretch bag and wherein assembling the set of intermediate stage consumables over the layup comprises overlaying the bleeder membrane over an exposed surface of the layup, overlaying the disposable thick breather layer over the bleeder membrane, overlaying the reusable thick breather layer over the disposable thick breather layer, overlaying a vacuum stretch bag over the thick breather layers, and sealing the vacuum stretch bag to the layup tool.

9. The method of claim 7, wherein the set of extended stage consumables includes a bleeder membrane configured to allow excess matrix material to bleed therethrough as the vacuum pressure is applied so that the excess matrix material is uniformly bled in a thickness direction from the layup to provide a homogenous distribution of the matrix material, a plurality of thin breather layers configured to absorb excess matrix material, the reusable thick breather layer, and the vacuum stretch bag and wherein assembling the set of extended stage consumables over the layup comprises overlaying the bleeder membrane over an exposed surface of the layup, overlaying the thin breather layers over the bleeder membrane, overlaying reusable the thick breather layer over the thin breather layers, overlaying the vacuum stretch bag over the reusable thick breather layer, and sealing the vacuum stretch bag to the layup tool.

10. The method of claim 7, wherein the predetermined intermediate debulk period of the intermediate debulk stage is about 15 minutes.

11. The method of claim 10, wherein the predetermined extended debulk period of the extended debulk stage is between about 12 hours to about 15 hours.

12. The method of claim 7, further comprising:
removing the set of intermediate stage consumables from the layup after the predetermined intermediate debulk period,
adding a predetermined number of prepreg ceramic plies to the layup after removing the set of intermediate stage consumables from the layup,
assembling a new set of intermediate stage consumables over the layup, and
repeating the steps of infiltrating the layup with a matrix material and applying the vacuum pressure for the predetermined intermediate debulk period before preforming the extended debulk stage.

13. The method of claim 7, further comprising
removing the set of extended stage consumables from the layup after the predetermined extended debulk period, adding a predetermined number of prepreg ceramic plies to the layup after removing the set of extended stage consumables from the layup, assembling a new set of intermediate stage consumables over the layup, and repeating the steps of infiltrating the layup with a matrix material and applying the vacuum pressure for the predetermined intermediate debulk period.

14. The method of claim 7, wherein the set of preliminary consolidation consumables includes a perforated release film layer, a plurality of thin breather layers, a thick breather layer, and a vacuum stretch bag and wherein assembling the set of preliminary consolidation consumables over the layup comprises overlaying the perforated release film layer over an exposed surface of the layup, overlaying the plurality of thin breather layers over the perforated release film layer, overlaying the thick breather layer over the thin breather layers, and overlaying the vacuum stretch bag over the thick breather layer.

15. The method of claim 7, wherein the set of final consolidation consumables includes a perforated release film layer, a release film layer, first and second thick breather layers, and a high-temperature stretch bag and wherein assembling the set of final consolidation consumables over the layup comprises overlaying the perforated release film layer over an exposed surface of the layup, overlaying the first thick breather layer over the perforated release film layer, overlaying the release film layer over the first thick breather layer, overlaying the second thick breather layer over the release film layer, and overlaying the high-temperature stretch bag over the second thick breather layer.

16. The method of claim 7, wherein heating the layup to the first predetermined temperature for the predetermined preliminary consolidation period includes increasing the temperature of the heat applied to the layup from an initial temperature to the first predetermined temperature, maintaining the first predetermined temperature for the predetermined preliminary consolidation period, and decreasing the heat applied to the layup back to the initial temperature after the predetermined preliminary consolidation period.

17. The method of claim 16, wherein heating the layup to the second predetermined temperature for the predetermined final consolidation period includes increasing the temperature of the heat applied to the layup from the initial temperature to the second predetermined temperature, maintaining the second predetermined temperature for the predetermined final consolidation period, and decreasing the heat applied to the layup back to the initial temperature after the predetermined final consolidation period.

18. The method of claim 17, wherein the predetermined preliminary consolidation period is equal to the predetermined final consolidation period.

19. The method of claim 18, wherein the temperature of the heat applied to the layup is increased at the same rate during the preliminary consolidation stage and the final consolidation stage.

20. The method of claim 18, wherein the vacuum pressure is the same at the preliminary consolidation stage and the final consolidation stage.

* * * * *